United States Patent [19]

Thoese

[11] Patent Number: 4,543,316

[45] Date of Patent: Sep. 24, 1985

[54] DRAFTING MATERIAL

[75] Inventor: Klaus Thoese, Wiesbaden, Fed. Rep. of Germany

[73] Assignee: Hoechst Aktiengesellschaft, Frankfurt am Main, Fed. Rep. of Germany

[21] Appl. No.: 581,596

[22] Filed: Feb. 21, 1984

[30] Foreign Application Priority Data

Feb. 23, 1983 [DE] Fed. Rep. of Germany ....... 3306191

[51] Int. Cl.$^4$ ......................... G03C 1/52; B32B 27/08; B32B 27/34

[52] U.S. Cl. ................................... 430/162; 428/201; 428/204; 428/207; 428/413; 428/474.4; 428/480; 428/483; 430/273; 430/527

[58] Field of Search ..................... 428/474.4, 207, 413, 428/201, 520, 204, 479.6, 480, 483; 430/527, 162, 273; 426/140; 427/393.5

[56] References Cited

U.S. PATENT DOCUMENTS

| | | |
|---|---|---|
| 3,720,539 | 3/1973 | Seibel et al. ...................... 427/393.5 |
| 3,857,729 | 12/1974 | Burwasser ........................... 430/527 |
| 3,993,850 | 11/1976 | Timmerman et al. ............ 428/474.4 |
| 4,066,820 | 1/1978 | Kelly et al. .......................... 428/483 |
| 4,097,645 | 6/1978 | Toyoda et al. ............... 428/474.4 X |

FOREIGN PATENT DOCUMENTS

| | | | |
|---|---|---|---|
| 0031899 | 6/1984 | European Pat. Off. ......... | 428/474.4 |
| 2949870 | 6/1981 | Fed. Rep. of Germany ... | 428/479.6 |
| 3207122 | 2/1982 | Fed. Rep. of Germany ...... | 428/480 |
| 865727 | 4/1961 | United Kingdom ............. | 428/479.6 |
| 1061784 | 3/1967 | United Kingdom ................ | 428/480 |
| 1127076 | 9/1968 | United Kingdom ................ | 428/480 |
| 1264338 | 2/1972 | United Kingdom ................ | 428/480 |
| 1269381 | 4/1972 | United Kingdom ................ | 428/413 |
| 1339317 | 12/1973 | United Kingdom ................ | 430/527 |
| 1388954 | 4/1975 | United Kingdom ................ | 428/413 |
| 1417419 | 12/1975 | United Kingdom ................ | 426/140 |
| 1448889 | 9/1976 | United Kingdom ................ | 428/520 |

OTHER PUBLICATIONS

H. Boardman, "Polyamide-Epichlorohydrin Resin with Antistatic Agent", p. 87.

Primary Examiner—Thomas J. Herbert
Attorney, Agent, or Firm—Schwartz, Jeffery, Schwaab, Mack, Blumenthal & Evans

[57] ABSTRACT

Disclosed is a drafting material comprising a plastic support having on at least one surface thereof an adhesive layer, a layer of pigmented or clear lacquer and a top layer which includes a homo- or copolymer of vinyl acetate and an antistatic agent, wherein the antistatic agent contained in the top layer is a polyamino/polyamide resin modified with an epihalohydrin, preferably epichlorohydrin, the resin being a condensation product of at least one aliphatic dicarboxylic acid or polymeric carboxylic acid and at least one polyamine.

14 Claims, No Drawings

4,543,316

DRAFTING MATERIAL

BACKGROUND OF THE INVENTION

The present invention relates to a drafting material comprising a plastic support having on at least one surface an adhesive layer, a layer of pigmented or clear lacquer and an antistatic top layer which contains a homo- or copolymer of vinyl acetate.

Drafting materials, such as, for example, drafting films, are generally made from a plastic support of cellulose acetate, polyvinyl chloride, polypropylene, or preferably polyester, particularly polyethylene terephthalate which has an adhesive layer on at least one surface. The film is preferably coated with a pigmented lacquer system, in order to obtain a surface which can be marked or written on with pencil lead and ink. The material can also be equipped with a separate top layer which is applied to the layer of pigmented lacquer, in order to facilitate ink adherence. In those cases where the film is to be written on with ink only, a transparent lacquer or an antistatic top layer can be applied directly to the adhesive layer.

There is known a film material which can be marked (German Offenlegungsschrift No. 2417879, equivalent to British Pat. No. 1,448,889) and which comprises a top layer, which is applied to a layer of pigmented lacquer and which consists of a homopolymer of vinyl acetate, a polymeric compound which mainly contains hydroxyl-containing or carboxyl-containing monomers, and a hydrophobicity-imparting agent. A top layer of this type is sensitive to water or moisture. If the hydrophobicity-imparting agent content is high, the wetting with aqueous drawing ink is also unsatisfactory. Finally, this film material lacks an antistatic finish.

Furthermore, a top layer has been disclosed for a matte film material which can be marked (German Offenlegungsschrift No. 2347324, equivalent to U.S. Pat. No. 3,857,729) and which includes a polyester support, a layer of film-forming cellulose lacquer thereon and an external layer as an antistatic coating. The antistatic agents used are water-soluble, relatively complex compounds of sulfonated polystyrene and a cycloaliphatic amine salt of an alcohol sulfate. Such a layer has the disadvantage that it is sensitive to humidity, and can always be dissolved from the surface with water.

A further disclosure (German Offenlegungsschrift No. 2513422, equivalent to British Pat. No. 1,497,657) describes a coated plastic film, such as a polyester film, having, if appropriate, applied to a substrate layer of acrylic or methacrylic acid copolymer, a layer which consists of an unhydrolyzed or partially hydrolyzed polymer or copolymer of vinyl acetate and a resinous component which is suitable for intramolecular cross-linking. The vinyl acetate copolymer contains at least 50 mole percent of vinyl acetate, and can contain a very wide variety of compounds as comonomers, such a dialkyl maleate, 2-ethylhexyl acrylate, ethylene, vinyl chloride or a vinyl ester of Versatic acid. Such a coated film is said to also be suitable for preparing drawing films provided appropriate additives are incorporated therein. However, no information is provided about a relevant composition. It is true that the incorporation of finely divided delustrants is likely to modify the film material in such a way that it can be marked, to a certain extent, with pencil leads, but additives of a kind suitable for writing with ink require considerable experimental effort with respect to the compatibility and adjustment of the substances relative to one another and required properties, such as the ability of inks to wet the surface in a suitable way, adhesion to the surface and correctability of symbols, and the like. This applies in particular to a possible addition of antistatic agents, which, as is known from experience, impairs ink-writing properties, on occasion to such an extent that the inks no longer wet.

In German Pat. No. 32,07,122, a drafting film is described which contains a pigmented lacquer system comprising an acrylic or methacrylic acid ester copolymer which includes at least 50% by weight of an ester monomer, the alcohol component of which has a chain length of at least four carbon atoms, and to which an antistatic agent selected from among the salts of polymeric sulfonic acids is added. This drafting film can be suitably marked with inks, although the edges of the ink lines are not yet sharp enough, and its antistatic finish, particularly if applied as top layer, is not sufficiently resistant to the action of water.

SUMMARY OF THE INVENTION

It is therefore an object of the present invention to provide a drafting film which can be marked with pencil lead and aqueous or India ink and which has good resistance properties.

An additional object of the invention is the provision of a drafting film which can be marked with both lead and ink, on which the lines of aqueous or India ink are sharp and of high density, and on which the nominal line widths specified for marking with technical pens are adhered to.

Yet another object of the invention is to provide a drafting film of the above type wherein it is possible to erase lines in a ghost-free manner.

Still another object of the invention is to provide a drafting film of the above type wherein the adhesion of the layers, as well as the adhesion of the applied symbols should satisfy high demands.

Additionally, an object of the invention is to provide a drafting film of the above type with an antistatic finish which possesses particularly good resistance to water, but does not impair the good wettability of the film with inks, nor adversely affect the necessary resistance of the drafting film to mechanical strain and elevated temperatures.

In accomplishing the foregoing objects, there has been provided in accordance with the present invention a drafting material comprising a plastic support, an adhesive layer applied on at least one surface of the support, a layer of lacquer applied on the adhesive layer, and a top layer comprising a homo- or copolymer of vinyl acetate and an antistatic agent, the antistatic agent comprising a polyamino/polyamide resin which is modified with epihalohydrin. The top layer preferably comprises a resin comprising a condensation product of at least one long-chain aliphatic, saturated dicarboxylic acid and at least one polyamine, which has been subsequently modified with epichlorohydrin.

Further objects, features and advantages of the present invention will become apparent from the detailed description of preferred embodiments which follows.

DETAILED DESCRIPTION OF PREFERRED EMBODIMENTS

According to the present invention, a film with a drafting layer satisfying highest demands is obtained.

The adhesion between the dimensionally stable plastic film and the pigmented lacquer system is excellent. The film can be well marked with graphite or plastic leads and easily erased. The mechanical strength, the thermal stability and the resistance to humidity, and in particular also the action of water, correspond to the demands made on a good drafting film. The writeability with aqueous drawing inks is reflected by the lines which have sharp edges and high density, i.e., the wetting with ink is satisfactory. The line widths obtained from writing with technical pens correspond to the prescribed nominal widths. Furthermore, the ink lines can be easily erased in a ghost-free manner. There is no charge build-up on the drafting surface during handling, i.e., the individual sheets of a stack can be easily detached from one another. Erasure scraps from erasing do not adhere to the film, and dust attraction is markedly reduced. The antistatic action is maintained even after the action of water on the marked film. Excellent images can, for example, also be produced using the developers customary in electrophotography.

The polyamino/polyamide resins modified with epihalohydrin, which are used for the top layer of the present invention, are known. The resins are used as sizing agents for paper and increase the wet resistance of paper, as is described in German Auslegeschrift No. 1,906,450 (equivalent to British Pat. No. 1,269,381), German Auslegeschrift No. 1,177,824 (equivalent to British Pat. No. 865,727), German Offenlegungsschrift No. 2,949,870 (equivalent to European Pat. No. 0,031,899), and German Auslegeschrift No. 1,771,243 (equivalent to British Pat. No. 1,388,954). In general, these are products which no longer contain free epihalohydrin. It is also known to employ these resins in the production of coated sausage casings, as anchoring agents by which the permeability to vapor and oxygen is reduced (German Auslegeschrift No. 2,162,204, equivalent to British Pat. No. 1,417,419). They are also known as components of adhesion promoters for photographic films (German Auslegeschrift No. 2,139,538, corresponding to British Pat. No. 1,339,317).

Accordingly, these polyamide resins containing amino groups and modified with epihalohydrin are suitable for use as strengthening and bonding agents, thereby taking advantage of their cross-linkability. The fact that in accordance with the instant invention these compounds can be employed as effective antistatic agents and, for example, in combination result in surfaces which can be well marked with aqueous inks and exhibit sharp ink line edges was completely surprising.

Commercially available polyamino/polyamide resins modified with epihalohydrin are obtained by condensing, for example, epichlorohydrin with an amino group-containing polyamide. Polyamines which can be used include normal alkylene diamines or polyalkylene polyamines, such as diethylene triamine, triethylene tetramine, tetraethylene pentamine and the corresponding polypropylene polyamines. The polyamino/polyamides are condensation products of a saturated, aliphatic, dibasic acid having an alkyl chain length of at least three carbon atoms and one of the above-named polyamines. Preference is given to an epichlorohydrin-modified polyamino/polyamide resin, which has been obtained from a condensation product of an dicarboxylic acid having at least ten carbon atoms and alkylene diamine or alkylene triamine. It is also possible to use mixtures as long as the polyamino/polyamide resin produced is soluble or at least dispersive in water.

Particularly suitable are those polyamino/polyamide resins which have been prepared using polymeric carboxylic acids containing at least 18 carbon atoms, and in which the base component is present in a stoichiometrical excess over the carboxy groups. The resins are prepared by heating the carboxylic acids with polyamines resulting in carboxylic acid amide amines. The polymeric carboxylic acids are, for example, obtained by a dimerization of unsaturated fatty acids present in industrial oils. Possible polyamines are ethylene diamine, diethylene triamine, propylene diamine, dipropylene triamine and the higher-molecular homologues thereof, such as, for example, hexamethylene diamine, and also the mixtures thereof.

Also included in the copolymer used for the top layer, in addition to the modified polyamino/polyamide resin, are at least about 90% by weight of vinyl acetate and at most about 10% by weight of unsaturated carboxylic acids. Comonomers which may be used are, for example, acids, such as maleic acid or maleic acid anhydride, citraconic acid, itaconic acid or crotonic acid. Copolymers, in which 95% by weight of vinyl acetate are contained, are preferably employed.

In a preferred embodiment, the top layer contains a copolymer comprised of at least about 90% by weight of vinyl acetate and at most about 10% by weight of crotonic acid, in combination with a water-soluble polyamino/polyamide resin modified with epichlorohydrin.

The top layer has a thickness corresponding to a layer weight of about 0.01 to 1 g/m$^2$. The mixing ratio of polyamino/polyamide resin to copolymer can vary within a range of between about 30 and 60% to between about 70 and 40% by weight, relative to the dry weight. The top layer preferably contains between about 30 and 40% by weight, relative to its total weight, of polyamino/polyamide resin modified with epichlorohydrin.

Suitable plastic supports include those made of polyvinyl chloride, polycarbonate, polystyrene, polysulfone, polyolefin, polyester or cellulose ester. Due to their excellent dimensional stability, which is of particular importance, films which are based on polyester, such as, for example, on polyethylene terephthalate, are preferably used.

The adhesive layers used are known mixtures, which are disclosed, for example, in German Pat. No. 12,28,414, equivalent to British Pat. No. 1,061,784, and consist of a mixture of the aqueous solution of a halocarboxylic acid, finely divided silica, and wetting agents, or of mixtures which are described in German Auslegeschrift No. 1,694,534, equivalent to British Pat. No. 1,209,992. Furthermore, substrated films as described in German Auslegeschrift No. 1,629,480, equivalent to British Pat. No. 1,127,076 and in German Auslegeschrift No. 2,034,407, equivalent to British Pat. No. 1,264,338, can be used.

The layers of pigmented lacquer can contain, as the film-forming material, a cellulose compound, such as, for example, cellulose acetate, cellulose nitrate, cellulose acetate butyrate, or cellulose acetate propionate, either alone or in mixtures with polyvinylidene chloride, polyvinyl chloride, polyvinyl acetate, polyurethane, polystyrene, polymethyl methacrylate, polyethyl methacrylate, polymethyl acrylate, polyethyl acrylate, the copolymer of acrylonitrile and butadiene/styrene, phenol formaldehyde, urea formaldehyde, polyisocyanates, polyesters and polycarbonates.

Another suitable layer of pigmented lacquer is, for example, described in German Offenlegungsschrift No. 2,417,879, which contains polyvinyl formal as polymeric compound and amorphous silicon dioxide and titanium dioxide as matting agent.

The top layer of the present invention is applied by means of one of the coating processes conventionally used for this purpose, for example, by means of a metering rod, by roller application or by means of an air knife. Suitable solvents are mixtures of alcohols and water. Their alcohol contents depends on the solubility of the raw materials, the wetting properties desired on the surface to be coated, and the adhesive strength of the substrate.

The top layer according to the invention can also contain suitable additives, such as fillers, dye-stuffs, pigments and crosslinking-assisting agents, such as compounds of metals of main and secondary group IV of the periodic table which are soluble in the solvents used.

The drafting material according to the invention can be used as a diazo-sensitized film, if a light-sensitive layer, in particular a layer containing diazo chemicals, such as a two-component diazotype layer comprised of diazonium salt and coupling component, stabilizer, etc., is applied to one surface, for example, the reverse surface of the film.

The invention will now be explained in greater detail by way of the non-limiting Examples which follow.

EXAMPLE 1

The plastic support used was a 75 $\mu$m thick film of polyethylene terephthalate which, on both sides, had an adhesive layer of vinylidene chloride copolymer, as disclosed, for example, in German Auslegeschrift No. 1,629,480 (equivalent to British Pat. No. 1,127,076). Furthermore, on top of the adhesive layer, an approximately 10 $\mu$m thick layer of pigmented lacquer comprised of cellulose acetopropionate containing finely divided silica and aluminum silicate as matting agent was present. 2.5% by weight strength solutions, in equal parts of water and isopropanol, of customary surface sizing agents were applied in thin top layers to this layer of pigmented lacquer, and dried. The top layers had a dry weight of between 100 and 300 mg/m$^2$.

After conditioning the samples for 24 hours at 23° C. and a relative humidity of 50%, the surface resistance of the layers was measured in accordance with the prescriptions of DIN 53482 or VDE 0303, part 3, using the electrode arrangement A (similar to IEC 167) and a measuring voltage of 100 V. The following results were obtained with the different surface sizing agents:

| CHEMICAL COMPOSITION OF THE SIZING OR WET STRENGTH IMPROVING AGENT | SURFACE RESISTANCE ($\Omega$) |
|---|---|
| (a) salt of a polyacrylic acid, anion-active, 26% strength, dissolved in water/isopropanol having a pH of 10 | $1.9 \times 10^{13}$ |
| (b) styrene/acrylate copolymer, cationic dispersion, 18% strength, in water, having a pH (1% strength) of about 3 | $2.7 \times 10^{13}$ |
| (c) styrene/acrylate copolymer, anion-active, 15% strength, having a pH of about 10 | $10^{14}$ |
| (d) modified polyamino/polyamide resin, cation-active, 14% strength solution in water having a pH of about 4.5 | $6.5 \times 10^9$ |
| (e) copolymer containing maleic acid anhydride, anion-active dispersion in water having a pH of about 10 | $3.4 \times 10^{13}$ |
| (f) copolymer containing maleic acid anhydride, cation-active dispersion, 25% strength, having a pH of about 4.5 to 5.5 | $10^{14}$ |

These results show that of the commercially available, customarily used sizing or strengthening agents only the cation-active polyamino/polyamide resin modified with epichlorohydrin imparts an antistatic action.

EXAMPLE 2

A plastic support as described in Example 1, provided with an adhesive layer and a layer of pigmented lacquer, was coated with top layers comprised of 2.5% by weight strength solutions in equal parts of water and isopropanol, the solids content of which consisted of a copolymer of 95% vinyl acetate and 5% crotonic acid, in the form of the ammonium salt (solution A).

Added to these solutions were the amounts, indicated in the Table below, of 2.5% by weight strength solutions of the epichlorohydrin-modified polyamino/polyamide resin described in Example 1 as a 14% by weight strength solution in water having a pH of about 4.5.

The subject of the test was adherence to the line width, by means of lines which had been drawn on the surface with TT drawing ink from Rotring and a technical pen for 1.4 mm wide lines. After the ink had dried, the line width was enlarged 44 times and measured in mm at several places, and the measured values were averaged. The theoretical value for an accurate adherence to the line width is about 6.2 cm.

Further measured parameters were the ink adhesion after a drying period of 24 hours, by means of a transparent adhesive tape (TESA 104); the wetting with TT ink, by inspecting the dried lines with a magnifying lens; and the surface resistance, by means of the method described in Example 1. The drafting material prepared employing the solution A was used as the blank.

| Sample | Proportion of modified polyamide (%) | ink adhesion | wetting with ink | line width | surface resistance ($\Omega$) |
|---|---|---|---|---|---|
| A | 0 | good | good | 6.6 | $7 \times 10^{13}$ |
| B | 10 | good | good | 6.5 | $10^{13}$ |
| C | 20 | good | good | 6.4 | $10^{12}$ |
| D | 30 | good | good | 6.3 | $9.5 \times 10^{10}$ |
| E | 40 | still good | good | 6.2 | $3.6 \times 10^{10}$ |
| F | 50 | still good | good | 6.1 | $3.6 \times 10^{10}$ |
| G | 100 | poor | still good | 6.4 | $8 \times 10^9$ |

The results compiled in the above Table show that the most favorable combination of properties is achieved with a proportion of 30 to 40% of epichlorohydrin-modified polyamino/polyamide resin.

EXAMPLE 3

A drafting material prepared in accordance with Example 2, sample D, was compared with a drafting film having a 75 μm thick polyester film, an adhesive layer, and a layer of pigmented lacquer comprised of cellulose acetopropionate and containing finely distributed silicon dioxide and aluminum silicate as matting agents and a cover layer comprised of a mixture of a vinyl acetate (95%)/crotonic acid (5%) copolymer with an acrylic or methacrylic acid ester copolymer and the acetal of polyvinyl alcohol with butyraldehyde sulfonic acid (sodium salt) as antistatic agent, in weight ratios of 70:20:10 (German Pat. No. 32 07 122). For this purpose, the layers were applied using an equipment provided with an air knife metering device and dried at temperatures of about 120° C.

The two plates could be marked equally well and had an equally good antistatic finish. However, unlike the Comparative sample, the sample prepared as sample D of Example 2 did not attract cigarette ashes after it had been rubbed with a cloth.

As a consequence of the action of water, the surface resistance of sample D increased from $10^{10}$ Ω to $10^{11}$ Ω, whereas the surface resistance of the comparative sample increased from $10^{10}$ Ω to $10^{13}$ Ω.

EXAMPLE 4

A material as described in Example 1 was provided with top layers having a dry weight of 0.3 g/m².

The applied solutions contained, as solid components, a copolymer of vinyl acetate and 5% crotonic acid, as ammonium salt, and a paper sizing agent comprised of an epichlorohydrin-modified polyamino/polyamide resin, in a weight ratio of 1:1. The solids concentration was 2.5%, and the solvent used was a mixture of equal parts of water and isopropanol.

The paper sizing agents employed for this purpose are characterized in the Table below. The products named A, B and D are epichlorohydrin-modified polyamino/polyamides of $C_3$ to $C_{10}$ dicarboxylic acids which are dissolved in water. The product named C is an epichlorohydrin-modified polyamino/polyamide of dicarboxylic acids having chain lengths of more than 10 carbon atoms, which has been dissolved in water.

TABLE

| Short name of sample | A | B | C | D |
| --- | --- | --- | --- | --- |
| Concentration (%) | 20 | 10 | 14 | 12.5 |
| Viscosity at 20° C. (mPa · s) | 35–70 | 10–14 | 5–15 | about 15 |
| pH | 2.5–3 | 4–4.5 | about 4.5 | 5 |
| spec. gravity (g/cm³) + | 1.056 to 1.062 | 1.022 to 1.024 | 1.02 | 1.034 |

+The specific gravities were determined at 20° C.

The top layers were subjected to the tests described in the Examples above. The blank used was a top layer which only comprised the vinyl acetate/crotonic acid copolymer. In the Table below, in which the test results are compiled, this sample is named O.

| Sample | O | A | B | C | D |
| --- | --- | --- | --- | --- | --- |
| Surface resistance (Ω) | $10^{14}$ | $3.0 \cdot 10^{10}$ | $3.5 \cdot 10^{10}$ | $3.6 \cdot 10^{10}$ | $1.4 \cdot 10^{12}$ |
| Width of ink lines (cm) | 6.8 | 6.5 | 6.5 | 6.1 | 6.3 |
| Wetting with ink | good | good | good | good | good |
| Ink adhesion | good | good | still good | still good | good |

EXAMPLE 5

The plastic support used was 125 μm thick polyethylene terephthalate film, one surface of which had been coated with an adhesive layer in accordance with German Auslegeschrift No. 16,29,480. A 6 μm thick coating of the following solution was applied by means of a doctor blade and dried in a circulating air drying oven at 110° C.

32 g of a copolymer comprising 95% of vinyl acetate and 5% of crotonic acid, as ammonium salt, 50% strength 94 g of methanol 376 g of acetone, to which a solution of 49 g of resin C of Example 4, 14% strength, in water, and 450 g of softened water was added.

The clear solution obtained had a pH of 5.8. A thin film having a surface resistance of $3.8 \cdot 10^{11}$ Ω formed. The width of the ink lines was well adhered to, the lines had sharp edges, and the wetting with ink and adhesion of the ink were excellent.

What is claimed is:

1. A drafting material for receiving an aqueous ink, comprising:
   a plastic support;
   an adhesive layer applied on at least one surface of said support;
   a layer of lacquer applied on said adhesive layer; and
   a top layer, comprising a homo- or copolymer of vinyl acetate and an antistatic agent, said antistatic agent comprising a polyamino/polyamide resin modified with an epihalohydrin.

2. A drafting material as claimed in claim 1, further comprising a layer of light-sensitive material on the reverse surface of the film.

3. A drafting material as claimed in claim 2, wherein said light-sensitive material layer comprises a two-component diazotype material.

4. A drafting material as claimed in claim 1, wherein said lacquer layer comprises a pigmented lacquer.

5. A drafting material as claimed in claim 1, wherein said lacquer layer comprises a clear lacquer.

6. A drafting material as claimed in claim 1, wherein said resin comprises a condensation product of at least one aliphatic, saturated, dibasic acid having an alkyl chain length of at least three carbon atoms and at least one polyamine.

7. A drafting material as claimed in claim 1, wherein said epihalohydrin comprises epichlorohydrin.

8. A drafting material as claimed in claim 7, wherein said top layer comprises an epichlorohydrin-modified polyamio/polyamide resin comprising a condensation product of a dicarboxylic acid with at least 10 carbon atoms and alkylene diamine or alkylene triamine.

9. A drafting material as claimed in claim 7, wherein said top layer comprises an epichlorohydrin-modified polyamino/polyamide resin comprising a condensation product of a polymeric carboxylic acid having at least 18 carbon atoms and a polyamine.

10. A drafting material as claimed in claim 7, wherein said top layer comprises from about 30 to 70% by weight of epichlorohydrin-modified polyamino/polyamide resin, relative to the total weight of said top layer.

11. A drafting material as claimed in claim 10, wherein said top layer comprises from about 30 to 40% by weight of epichlorohydrin-modified polyamino/polyamide resin, relative to the total weight of said top layer.

12. A drafting material as claimed in claim 1, wherein said copolymer of said top layer comprises about 90% by weight of vinylacetate and about 10% by weight of unsaturated carboxylic acid.

13. A drafting material as claimed in claim 12, wherein said copolymer comprises about 95% by weight of vinylacetate.

14. A drafting material as claimed in claim 12, wherein said copolymer comprises about 10% by weight of crotonic acid.

* * * * *